No. 776,037. PATENTED NOV. 29, 1904.
G. E. TOWNSEND.
SCRAPER FOR ROAD ROLLERS.
APPLICATION FILED JULY 20, 1903.
NO MODEL. 2 SHEETS—SHEET 1.
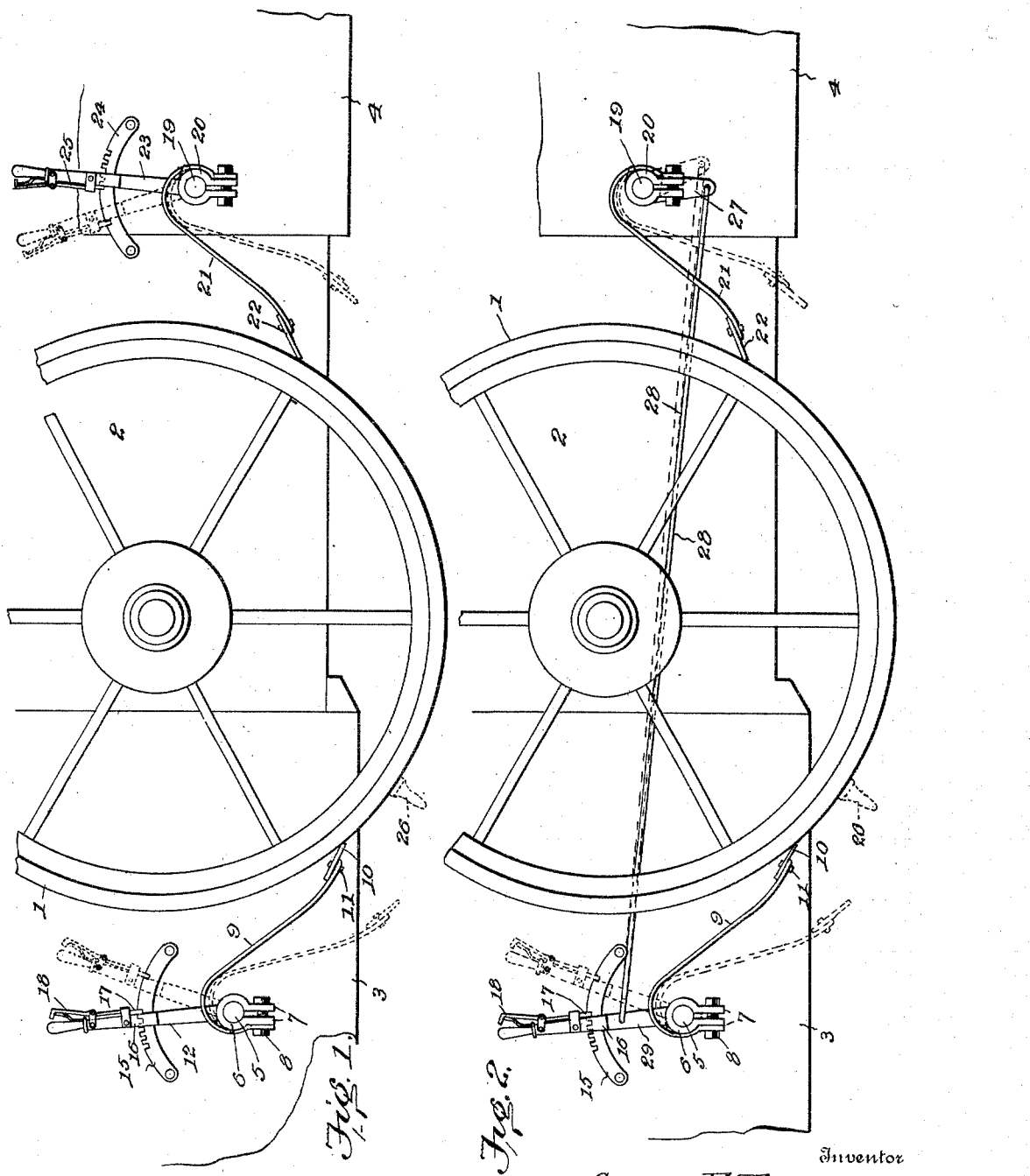
Witnesses
G. Howard Walmsley.
Isomie Miller.
Inventor
George E. Townsend,
By
Attorney No. 776,037. PATENTED NOV. 29, 1904.
G. E. TOWNSEND.
SCRAPER FOR ROAD ROLLERS.
APPLICATION FILED JULY 20, 1903.
NO MODEL. 2 SHEETS—SHEET 2.

Witnesses
G. H. Walmsley
Irome Miller

Inventor
George E. Townsend,
By H. A. Toulmin.
Attorney

No. 776,037.

Patented November 29, 1904.

UNITED STATES PATENT OFFICE.

GEORGE E. TOWNSEND, OF SPRINGFIELD, OHIO, ASSIGNOR TO THE KELLEY-SPRINGFIELD ROAD ROLLER COMPANY, OF SPRINGFIELD, OHIO, A CORPORATION OF OHIO.

SCRAPER FOR ROAD-ROLLERS.

SPECIFICATION forming part of Letters Patent No. 776,037, dated November 29, 1904.

Application filed July 20, 1903. Serial No. 166,255. (No model.)

*To all whom it may concern:*

Be it known that I, GEORGE E. TOWNSEND, a citizen of the United States, residing at Springfield, in the county of Clark and State of Ohio, have invented certain new and useful Improvements in Scrapers for Road-Rollers, of which the following is a specification, reference being had therein to the accompanying drawings.

This invention relates to scrapers for road-rollers, and has for its object, primarily, to provide a construction such that the scrapers may be readily moved away from the surface of the wheels or rollers when these latter are equipped with spikes for breaking up the ground and may be as readily returned to a position in operative contact with the wheels when desired.

To these and other ends my invention consists in certain novel features which I will now proceed to describe and will then particularly point out in the claims.

Figure 3:
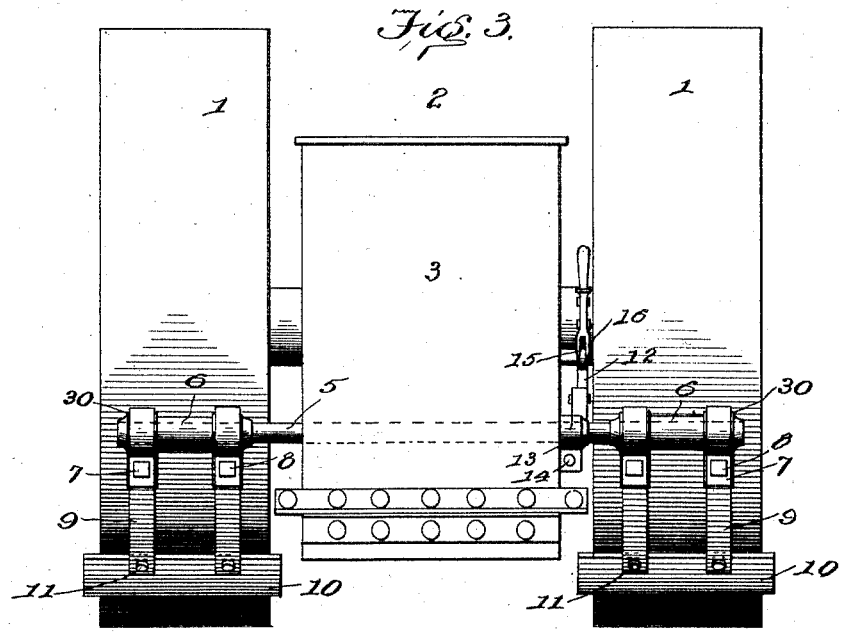
Figure 4:
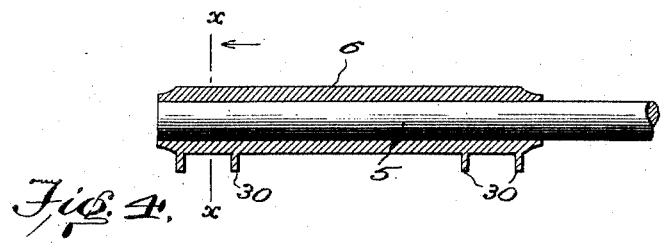
Figure 5:
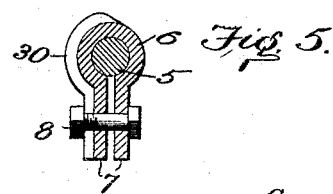

In the accompanying drawings, Figure 1 is a side elevation of a portion of a steam road-roller having my invention applied thereto in one form. Fig. 2 is a similar view illustrating a modification. Fig. 3 is a rear elevation. Fig. 4 is a detail sectional view, in longitudinal section, of one of the sleeves; and Fig. 5 is a transverse sectional view of the same.

In the said drawings the main or driving wheels of a steam road-roller are indicated at 1, the machine as a whole being indicated by the numeral 2 and being provided both in front of and behind the main wheels with the usual tanks or boxes 3 and 4. In the tank 3 there is mounted so as to turn in suitable bearings therein a shaft 5, which projects beyond said tank upon each side thereof, said shaft being parallel with the axis of rotation of the wheels 1. On each of the projecting ends of the shaft 5 is mounted a sleeve 6, split longitudinally and provided near each end with lugs 7 to receive a clamping-bolt 8, by means of which said sleeve may be firmly clamped to the shaft. Each sleeve has connected therewith two curved spring-arms 9, this connection being preferably effected by means of the clamping-bolts 8. In this construction the fixed end of each spring-arm is secured against the outermost lug 7 by being clamped against it by the head of the bolt 8, which passes through a suitable aperture in the end of the spring-arm. Said spring-arm then extends upward in a diverging curve around the sleeve 6, and thence downward toward the periphery of the wheel 1, the free ends of each pair of spring-arms 9 serving to support a scraper-blade 10, which is removably secured to said arms by means of bolts 11, so as to be removable therefrom to facilitate renewal.

The shaft 5 is provided on one side of the machine with an operating hand-lever 12, secured to said shaft in any suitable way—as, for instance, by a split clamping-hub 13 and clamping-bolt 14. Coöperating with the lever 12 is a notched segment-bar 15, secured to the tank 3 and passing through a loop or slot 16 in the lever 12. Said lever 12 is provided with a spring locking-pawl 17 and pawl-controlling lever 18 to lock said operating-lever 12 in any desired position relatively to the segment 15.

In front of the wheels 1 there is mounted in the tank 4 a shaft 19, similar to the shaft 5, projecting beyond the tank 4 at each side of the machine and provided on each end with a sleeve 20, firmly clamped in position on the shaft and carrying spring-arms 21, provided at their free ends with scraper-blades 22, said sleeve, spring-arms, and scraper-blades corresponding in all respects with the similar parts at the rear of the wheel, but being reversely arranged, as shown in Fig. 1. The shaft 19 is provided with a lever 23, corresponding with the lever 12, and with a locking-segment 24 and engaging mechanism 25, whereby said lever may be locked in position.

It will be seen that when the machine is operating as a roller the scraper-blades may be brought up against the treads of the main wheels both at the front and at the rear and may be held against said wheels with a yielding pressure which is readily regulated by the position of the hand-levers 12 and 23. Both of the rear scrapers are simultaneously operated by the lever 12, and both of the front scrapers are simultaneously operated by the lever 23. When it is desired to use the machine as a spiker, spikes 26 (shown in dotted lines in Figs. 1 and 2) are inserted in the tread of the wheels, and the scraper-blades may be then instantly swung away from the wheels, so as to clear the spikes by means of the controlling-levers. Heretofore this has been a tedious operation, necessitating the loosening of the clamping-nuts which hold the sleeves on the shafts.

As an obvious modification a single controlling-lever may be employed to operate both of the shafts 5 and 19. Such a construction is shown in Fig. 2, in which the hand-lever of one of the shafts is dispensed with, said shaft being provided with a projecting arm 27, which is connected by a link or rod 28 with the single controlling-lever, (indicated in this case by the reference-numeral 29.)

Numerous other modifications will readily suggest themselves, and I therefore do not wish to be understood as limiting myself to the precise details of construction hereinbefore described, and shown in the accompanying drawings.

In order to firmly secure the ends of the springs in position, the lugs to which they are clamped are provided with lateral ribs 30, between which the spring is seated and by which it is prevented from being displaced laterally. These ribs also extend partly around the sleeve, as shown more particularly in Figs. 4 and 5.

Having thus fully described my invention, what I claim as new, and desire to secure by Letters Patent, is—

1. A road-roller comprising a body and wheels on opposite sides thereof, in combination with rotatable shafts mounted in the body in front of and behind said main wheels parallel with the axis of rotation thereof, each shaft being provided on its projecting ends with resilient scraper-bearing arms, said arms and their scrapers being directed at an acute angle downward toward the peripheries of said main wheels, and means for positively rotating said shafts and securing them in the position to which they are rotated, whereby the scrapers are adjusted toward and from the wheels, whereby the pressure of the scrapers against the wheels may be regulated, substantially as described.

2. A road-roller comprising a body and wheels on opposite sides thereof, in combination with two parallel rock-shafts mounted in the body in front of and behind the wheels, the projecting ends of each shaft being provided with resilient scraper-bearing arms, and means for simultaneously rotating both shafts to adjust the scrapers toward and from the wheels, said arms and scrapers extending downward in the direction of the peripheries of the wheels so as to meet the same at an acute angle when engaged therewith, substantially as described.

3. The combination, with the body of a road-roller, and wheels on the opposite sides thereof, of a shaft extending through said body and mounted to rotate therein, resilient arms mounted on the projecting ends of said shaft and provided with scraper-blades, said arms and scraper-blades extending downward so as to meet the peripheries of the wheels at an acute angle when in contact therewith, and an operating-lever connected with said shaft and provided with locking devices to lock it in different positions, substantially as described.

4. A scraper for road-rollers, comprising a shaft mounted to rotate in suitable bearings, an operating-lever connected with said shaft and provided with locking means, and resilient arms extending from said shaft and provided with scraper-blades at their free ends, said arms extending downward so as to meet the peripheries of the wheels at an acute angle, substantially as described.

5. In a scraper for road-rollers, the combination, with a rock-shaft provided with an operating-lever and locking means therefor, of a sleeve secured on said rock-shaft, spring-arms secured at one end to said sleeve and extending toward the wheel, and a scraper-blade secured on the free ends of said spring-arms, substantially as described.

6. In a scraper for road-rollers, the combination, with a rock-shaft and means for adjusting the same angularly, of a split sleeve provided with projecting lugs and clamping-screws whereby it may be clamped on said shaft, spring-arms secured to said sleeves and curving upwardly over the same and then downwardly toward the wheel, and a scraper-blade secured to the free ends of said spring-arms, substantially as described.

In testimony whereof I affix my signature in presence of two witnesses.

GEORGE E. TOWNSEND.

Witnesses:
E. O. HAGAN,
IRVINE MILLER.